United States Patent
Okubo et al.

(10) Patent No.: US 12,026,040 B2
(45) Date of Patent: Jul. 2, 2024

(54) ABNORMALITY DETERMINATION SYSTEM, ABNORMALITY DETERMINATION APPARATUS, AND ABNORMALITY DETERMINATION METHOD

(71) Applicant: KABUSHIKI KAISHA YASKAWA DENKI, Kitakyushu (JP)

(72) Inventors: Tadashi Okubo, Kitakyushu (JP); Toshinobu Kira, Kitakyushu (JP); Junya Hisamatsu, Kitakyushu (JP); Minoru Koga, Kitakyushu (JP)

(73) Assignee: KABUSHIKI KAISHA YASKAWA DENKI, Kitakyushu (JP)

( * ) Notice: Subject to any disclaimer, the term of this patent is extended or adjusted under 35 U.S.C. 154(b) by 95 days.

(21) Appl. No.: 17/897,218

(22) Filed: Aug. 29, 2022

(65) Prior Publication Data
US 2023/0106184 A1  Apr. 6, 2023

(30) Foreign Application Priority Data
Oct. 1, 2021 (JP) .................. 2021-162831

(51) Int. Cl.
G06F 11/00  (2006.01)
G06F 11/07  (2006.01)
G07C 5/08  (2006.01)

(52) U.S. Cl.
CPC ...... *G06F 11/0751* (2013.01); *G06F 11/0739* (2013.01); *G07C 5/0808* (2013.01)

(58) Field of Classification Search
CPC ............. G06F 11/0739; G06F 11/0751; G07C 5/0808
See application file for complete search history.

(56) References Cited

U.S. PATENT DOCUMENTS

| | | | | |
|---|---|---|---|---|
| 2005/0157327 A1* | 7/2005 | Shoji | ............... | G06F 11/0751 358/1.14 |
| 2005/0192722 A1* | 9/2005 | Noguchi | .............. | G07C 5/0808 701/33.4 |
| 2015/0279129 A1* | 10/2015 | Ishikawa | ............ | G05B 23/0281 701/29.1 |
| 2016/0314632 A1* | 10/2016 | Lu | .......................... | G07C 5/085 |

(Continued)

FOREIGN PATENT DOCUMENTS

| | | |
|---|---|---|
| JP | 06-187030 | 7/1994 |
| JP | 2017-151598 | 8/2017 |

(Continued)

OTHER PUBLICATIONS

Japanese Office Action for corresponding JP Application No. 2021-162831, Oct. 6, 2023 (w/ English machine translation).

*Primary Examiner* — Joshua P Lottich
(74) *Attorney, Agent, or Firm* — MORI & WARD, LLP

(57) ABSTRACT

An abnormality determination system includes first data acquisition circuitry configured to acquire time-series data relating to an operation of a device, sample data creation circuitry configured to create sample data based on abnormality time-series data which the first data acquisition circuitry acquires while an abnormality occurs in the operation of the device, and first abnormality determination circuitry configured to determine the abnormality in the operation of the device based on the time-series data and the sample data.

13 Claims, 12 Drawing Sheets

(56) References Cited

U.S. PATENT DOCUMENTS

| | | | |
|---|---|---|---|
| 2017/0242076 A1 | 8/2017 | Yoshiura | |
| 2017/0326926 A1* | 11/2017 | So | B60C 23/0474 |
| 2017/0351563 A1* | 12/2017 | Miki | G06F 11/0751 |
| 2019/0035170 A1* | 1/2019 | Dede | G07C 5/0808 |
| 2019/0042675 A1* | 2/2019 | Martin | G06N 20/00 |
| 2019/0129372 A1 | 5/2019 | Shogaki et al. | |
| 2019/0333294 A1* | 10/2019 | Sundareswara | G07C 5/0808 |
| 2020/0057690 A1* | 2/2020 | Hiroe | G06F 11/079 |
| 2020/0287497 A1 | 9/2020 | Nagata et al. | |
| 2020/0387418 A1* | 12/2020 | Suzuki | G06F 11/0751 |
| 2021/0086773 A1* | 3/2021 | Kogano | B60W 30/18154 |
| 2021/0117268 A1* | 4/2021 | Koeberl | G06F 11/0709 |
| 2021/0179120 A1* | 6/2021 | Yoshino | B60W 50/0205 |
| 2022/0068051 A1 | 3/2022 | Krishnamurthy | G05B 23/0283 |
| 2023/0005308 A1* | 1/2023 | Sakata | G07C 5/008 |
| 2023/0410574 A1* | 12/2023 | Naiki | B60R 16/02 |

FOREIGN PATENT DOCUMENTS

| | | |
|---|---|---|
| JP | 2019-24305 | 2/2019 |
| JP | 6593715 B2 | 5/2019 |
| JP | 6569927 B1 | 9/2019 |
| JP | 2020-25461 | 2/2020 |
| JP | 2020-25462 | 2/2020 |
| WO | WO 2019/106875 | 6/2019 |

\* cited by examiner

FIG. 5
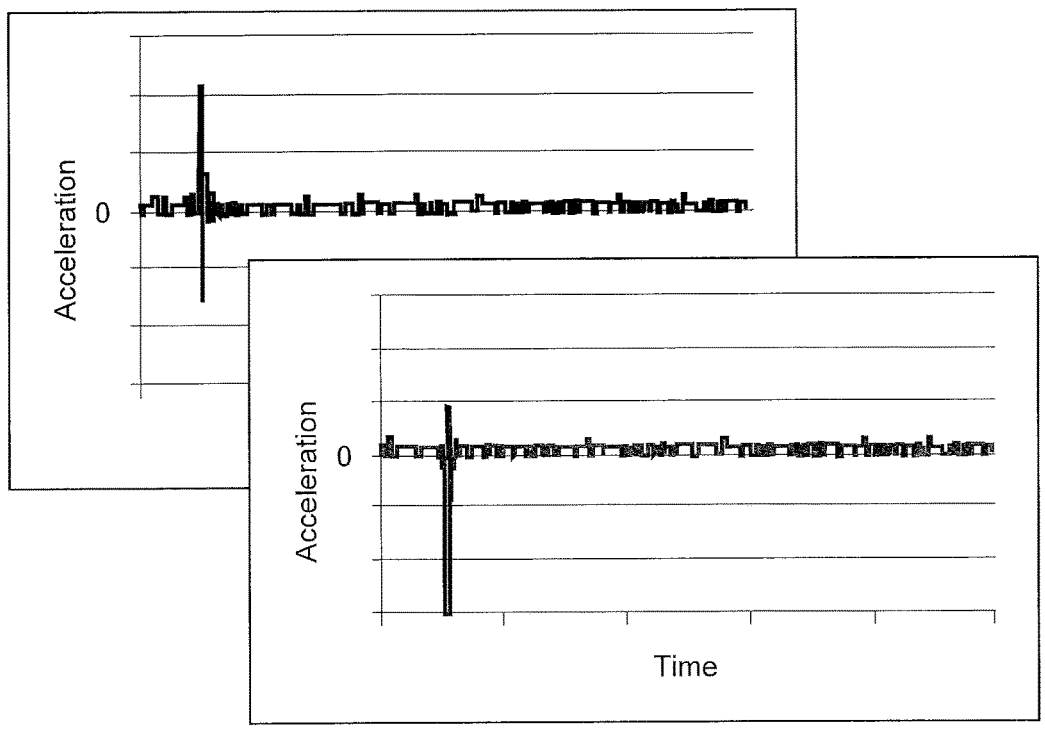
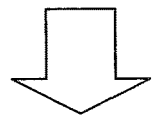
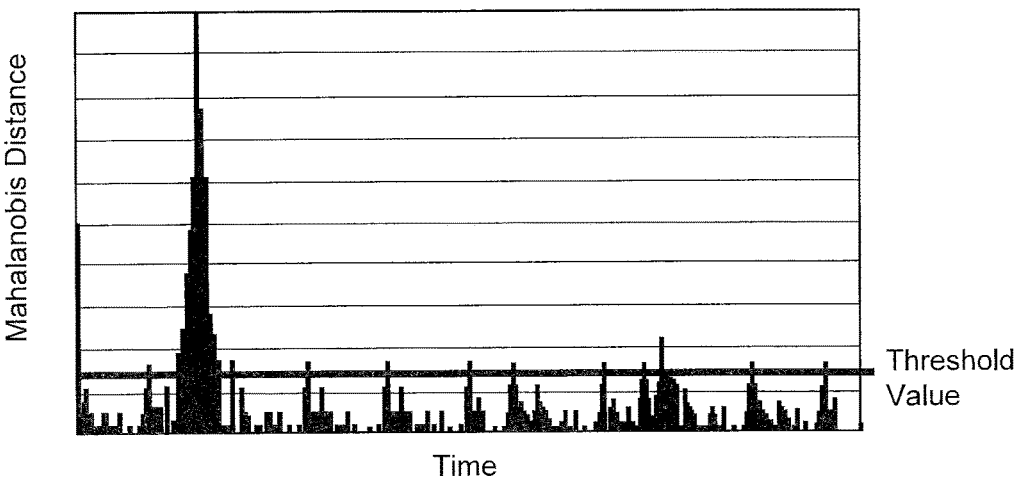
Number of Points at which Mahalanobis distance is equal to or greater than the threshold value > Predetermined Value
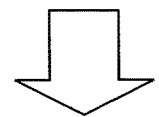
Determined to be normal

FIG. 6
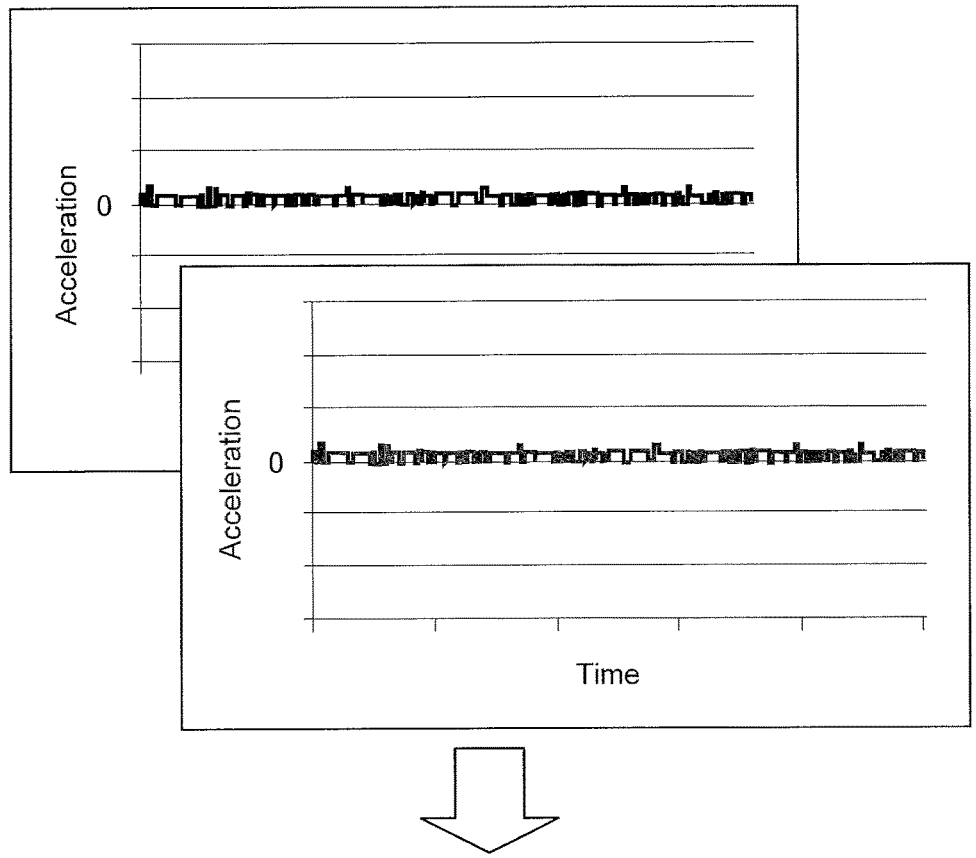
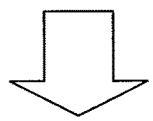
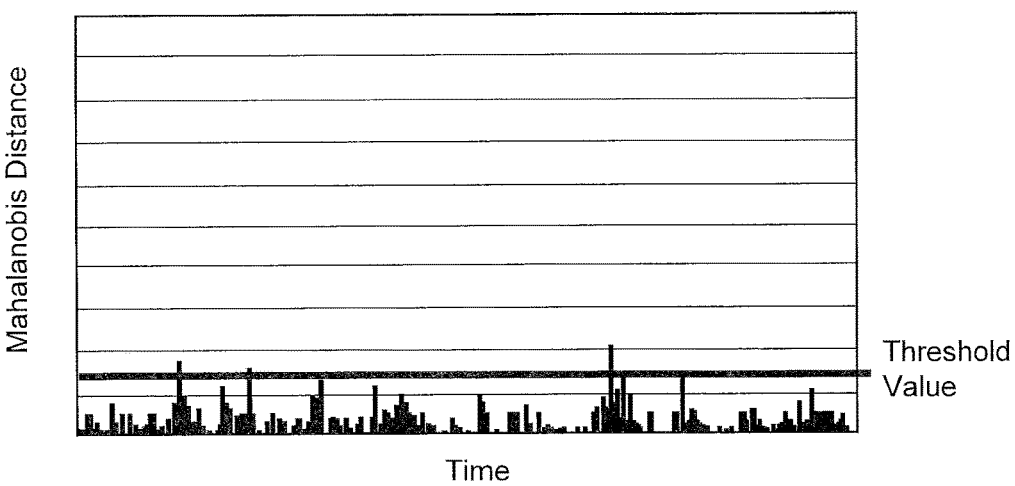
Number of Points at which Mahalanobis distance is equal to or greater than the threshold value $<$ Predetermined Value
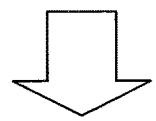
Determined to be abnormal

FIG. 7

| State Quantity Data | Determination Condition | Determination Result | Determination Timing |
|---|---|---|---|
| Moment of Inertia Estimated Value | Moment of Inertia Estimated Value < Threshold Value | Normal | At the time when outputting motor command for the first time after release of brake |
| | Moment of Inertia Estimated Value > Threshold Value | Abnormal | |

In Normal Condition

In Abnormal Condition

FIG. 10

| State Quantity Data | Determination Condition | Determination Result | Determination Timing |
|---|---|---|---|
| Disturbance Torque Estimated Value Torque Command Value | Disturbance Torque Estimated Value < Threshold Value | Normal | At the time when outputting motor command for the first time after release of brake |
| | Disturbance Torque Estimated Value < Threshold Value Disturbance Torque Estimated Value ≒ Torque Command Value | Abnormal | |

ABNORMALITY DETERMINATION SYSTEM, ABNORMALITY DETERMINATION APPARATUS, AND ABNORMALITY DETERMINATION METHOD

CROSS-REFERENCE TO RELATED APPLICATIONS

The present application claims priority under 35 U.S.C. § 119 to Japanese Patent Application No. 2021-162831, filed Oct. 1, 2021. The contents of this application are incorporated herein by reference in their entirety.

BACKGROUND OF THE INVENTION

Field of the Invention

Disclosed embodiments relate to an abnormality determination system, an abnormality determination apparatus, and an abnormality determination method.

Discussion of the Background

Japanese Unexamined Patent Publication No. 2017-151598 discloses an abnormality determination apparatus for determining a mechanical abnormality of a motor drive mechanism. The abnormality determination apparatus acquires a plurality of time-series data relating to the input/output of the motor in a normal state to create sample data, compares the present time-series data with the sample data, and calculates a Mahalanobis distance to determine abnormality.

SUMMARY OF THE INVENTION

According to one aspect of the present invention, an abnormality determination system includes first data acquisition circuitry configured to acquire time-series data relating to an operation of a device, sample data creation circuitry configured to create sample data based on abnormality time-series data which the first data acquisition circuitry acquires while an abnormality occurs in the operation of the device, and first abnormality determination circuitry configured to determine the abnormality in the operation of the device based on the time-series data and the sample data.

According to another aspect of the present invention, an abnormality determination system includes operation command output circuitry configured to output an operation command to operate a motor; first data acquisition circuitry configured to acquire, before the operation command output circuitry outputs the operation command, time-series data relating to a releasing operation of a brake which is configured to brake the motor; first abnormality determination circuitry configured to determine, before the operation command output circuitry outputs the operation command, an abnormality in the releasing operation based on the time-series data; second data acquisition circuitry configured to acquire, after the operation command output circuitry outputs the operation command, state quantity data relating to an operation of the motor; and second abnormality determination circuitry configured to determine, after the operation command output circuitry outputs the operation command, the abnormality in the releasing operation based on the state quantity data.

According to further aspect of the present invention, an abnormality determination system includes operation command output circuitry configured to output an operation command to operate a motor; data acquisition circuitry configured to acquire, after the operation command output circuitry outputs the operation command, state quantity data relating to an operation of the motor; and abnormality determination circuitry configured to determine based on the state quantity data, after the operation command output circuitry outputs the operation command, an abnormality in a releasing operation of a brake which is configured to brake the motor.

According to the other aspect of the present invention, an abnormality determination apparatus includes first data acquisition circuitry configured to acquire time-series data relating to an operation of a device; and first abnormality determination circuitry configured to determine an abnormality in the operation of the device based on the time-series data and sample data created based on abnormality time-series data which the first data acquisition circuitry acquires while the abnormality occurs in the operation of the device.

According to the other aspect of the present invention, an abnormality determination apparatus includes first data acquisition circuitry configured to acquire, before an operation command for operating a motor is output, time-series data relating to a releasing operation of a brake which is configured to brake the motor; first abnormality determination circuitry configured to determine, before the operation command is output, an abnormality in the releasing operation based on the time-series data; second data acquisition circuitry configured to acquire, after the operation command is output, state quantity data relating to an operation of the motor; and second abnormality determination circuitry configured to determine, after the operation command is output, the abnormality in the releasing operation based on the state quantity data.

According to the other aspect of the present invention, an abnormality determination method includes acquiring time-series data relating to an operation of a device; and determining an abnormality in the operation of the device based on the acquired time-series data and sample data created based on abnormality time-series data which is acquired while the abnormality occurs in the operation of the device.

According to the other aspect of the present invention, an abnormality determination method includes acquiring, before an operation command for operating a motor is output, time-series data relating to a releasing operation of a brake which is configured to brake the motor; determining, before the operation command is output, an abnormality in the releasing operation based on the time-series data; acquiring, after the operation command is output, state quantity data relating to an operation of the motor; and determining, after the operation command is output, the abnormality in the releasing operation based on the state quantity data.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings.

FIG. 5 is an explanatory diagram showing an example of an abnormality determination method by the first abnormality determination unit.

FIG. 6 is an explanatory diagram showing another example of an abnormality determination method by the first abnormality determination unit.

FIG. 7 is a diagram showing an example of an abnormality determination method using a moment of inertia estimated value by the second abnormality determination unit.

FIG. 10 is a diagram showing an example of an abnormality determination method using an estimated disturbance torque value by the second abnormality determination unit.

DESCRIPTION OF THE EMBODIMENTS

Embodiments will be described below with reference to the drawings.

Overall Configuration of Abnormality Determination System

An example of the overall configuration of an abnormality determination system according to the present embodiment will be described with reference to FIG. 1. The abnormality determination system 1 is a system for determining an operation abnormality of the device. In the present embodiment, a description will be given of a case where the abnormality determination system 1 determines, for example, an abnormality in a releasing operation of a brake for braking a motor.

Figure 1:
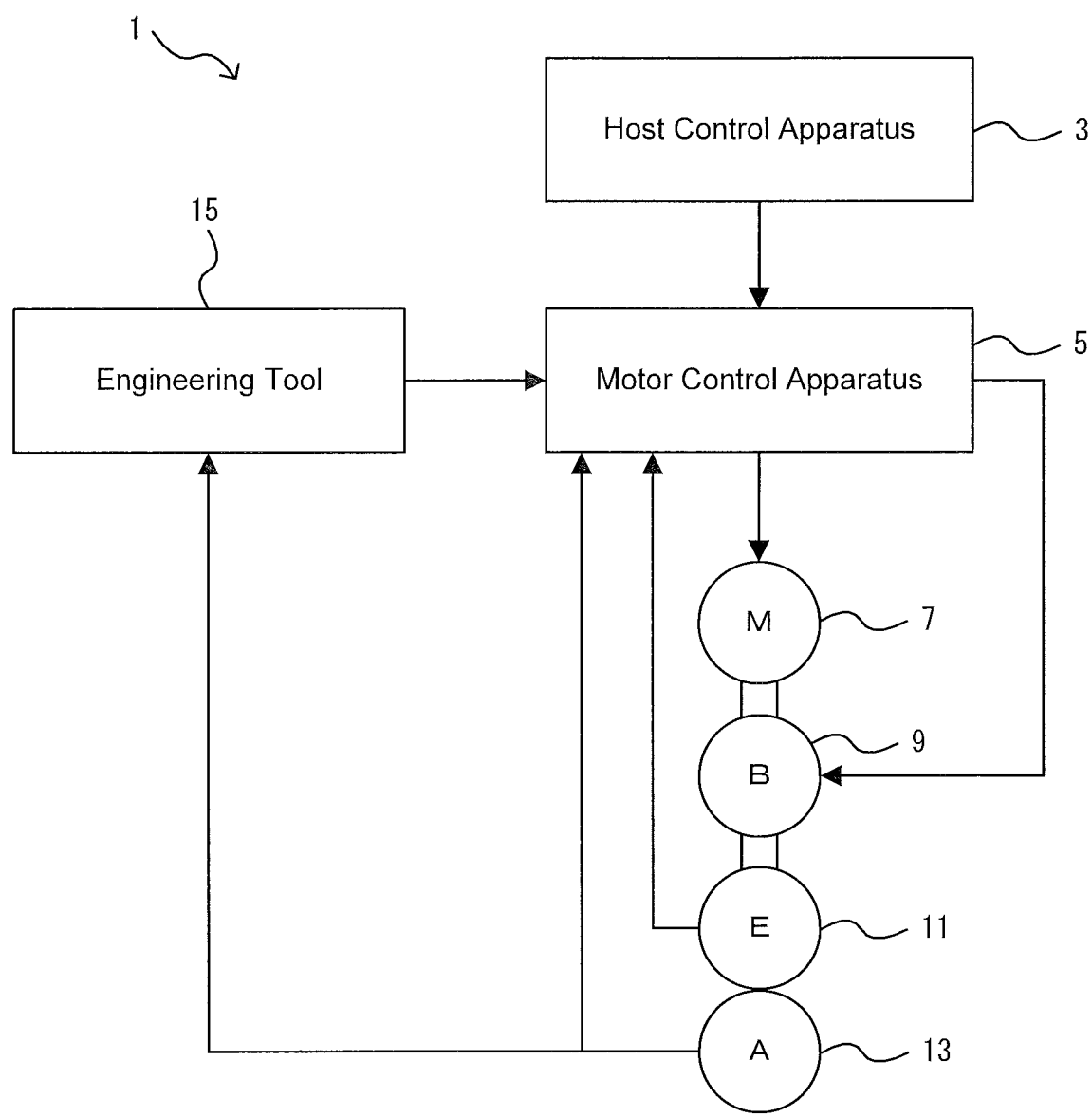
FIG. 1 is a diagram showing an example of the overall configuration of an abnormality determination system according to an embodiment.

As shown in FIG. 1, the abnormality determination system 1 includes a host control apparatus 3, a motor control apparatus 5, a motor 7, a brake 9, an encoder 11, an acceleration sensor 13, and an engineering tool 15.

The host control apparatus 3 is constituted by a computer such as a general-purpose personal computer, a PLC (Programmable logic controller), and a motion controller, for example. The host control apparatus 3 generates a motor command (for example, a position command, a speed command, a torque command, etc.) for controlling the operation of the motor 7 and transmits the generated motor command to the motor control apparatus 5. In addition, the host control apparatus 3 generates a brake command for operating or releasing the brake 9 and transmits it to the motor control apparatus 5.

The motor control apparatus 5 supplies electric power to the motor 7 based on the motor command received from the host control apparatus 3 and the detection data received from the encoder 11, thereby controlling the operation of the motor 7. Further, the motor control apparatus 5 supplies or cuts off electric power to the brake 9 based on the brake command received from the host control apparatus 3, thereby controlling the operation of the brake 9. In addition, the motor control apparatus 5 determines whether or not the releasing operation of the brake 9 is abnormal based on the time-series data acquired from the acceleration sensor 13 and the sample data created by the engineering tool 15. The motor control apparatus 5 is also referred to as a servo amplifier.

The motor 7 is, for example, a rotary motor. The type of the motor 7 is not limited to a rotary type motor, but may be a linear type motor. The brake 9 brakes and releases braking of the motor 7. In this embodiment, braking of the motor 7 by the brake 9 is referred to as "actuation", and releasing of braking of the motor 7 is referred to as "release". The encoder 11 detects the rotational position and rotational speed of the motor 7, and transmits the detected data to the motor control apparatus 5. The acceleration sensor 13 detects the vibration caused by the releasing operation of the brake 9, and transmits the detection data to the motor control apparatus 5 or the engineering tool 15. The acceleration sensor 13 is provided, for example, in the encoder 11. The location of the acceleration sensor 13 is not limited to the encoder 11, but may be, for example, the motor 7 or the brake 9.

The engineering tool 15 is, for example, a general-purpose personal computer. It should be noted that a specific application (for example, creation of sample data). It may be a dedicated computer designed specifically for it. The engineering tool 15 creates sample data based on the time-series data received from the acceleration sensor 13. The sample data created by the engineering tool 15 is transmitted to and recorded in the motor control apparatus 5.

The configuration of the abnormality determination system 1 described above is an example, and is not limited to the above-described contents. For example, the function of determining abnormality in the releasing operation of the brake 9 may be implemented not in the motor control apparatus 5 but in the host control apparatus 3 or the engineering tool 15, or may be implemented in an abnormality determination apparatus separate from these control apparatuses. In this case, data necessary for abnormality determination may be acquired from the motor control apparatus 5 or the like. Further, the function of controlling the brake 9 may be implemented not in the motor control apparatus 5 but in the host control apparatus 3 or the engineering tool 15, or may be implemented in a brake control apparatus separate from these control apparatuses. Further, each function of the host control apparatus 3, the motor control apparatus 5, and the engineering tool 15 may be configured as fewer devices (for example, a single or two control apparatuses) or as more devices (for example, four or more control apparatuses).

2. Configuration of Motor, Brake, and Encoder

Figure 2:
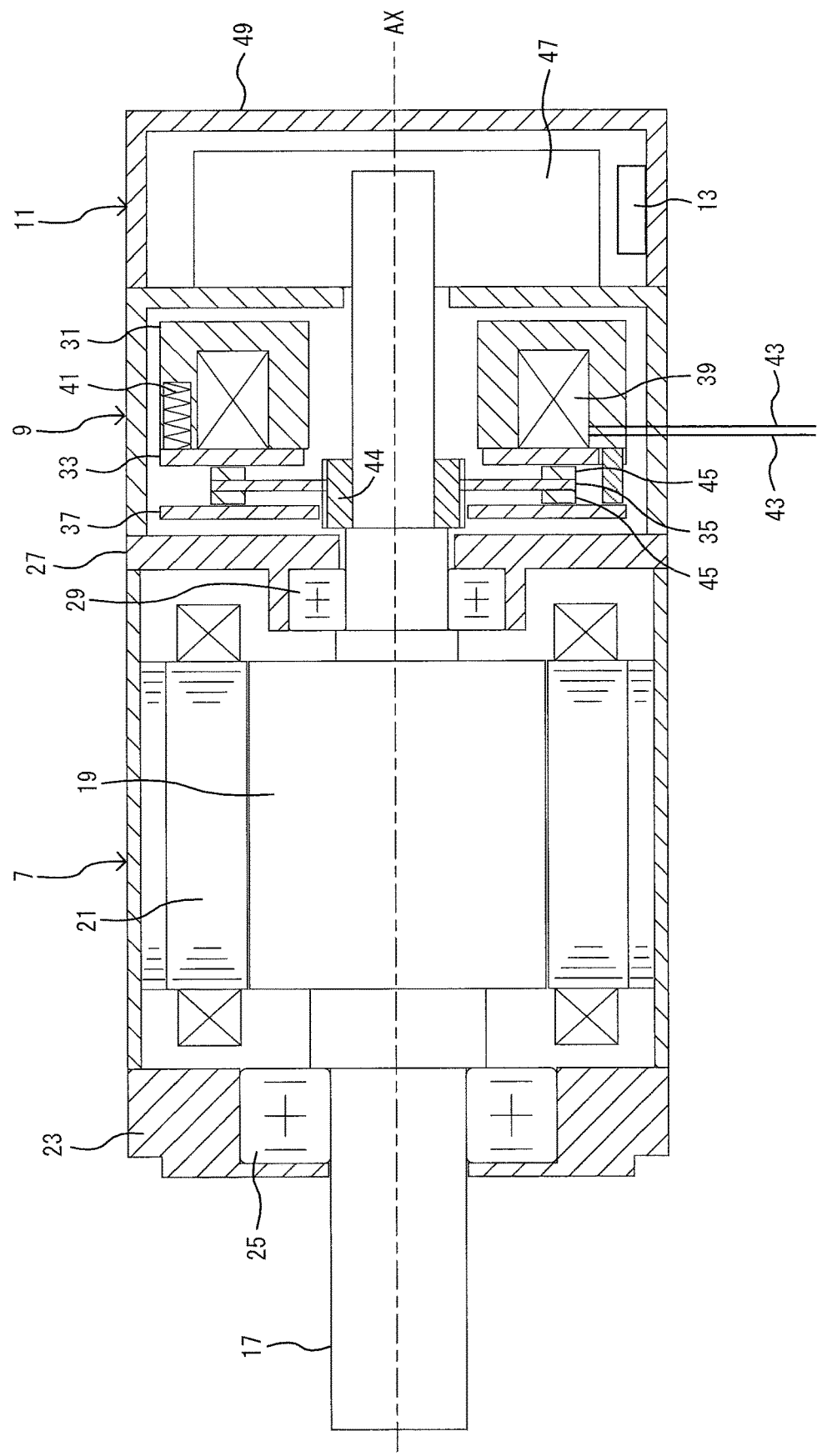
FIG. 2 is a cross-sectional view showing an example of a configuration of a motor, a brake, and an encoder.

Referring to FIG. 2, an example of the configuration of the motor 7, the brake 9, and the encoder 11 will be described. In the following description, the "load side" refers to a direction in which a load is attached to the motor 7, for example, a direction in which the shaft 17 protrudes (on the left side in FIG. 2), and the "counter load side" refers to a direction opposite to the load side (on the right side in FIG. 2).

As shown in FIG. 2, the motor 7 includes a shaft 17, a rotor 19, a stator 21, a load-side bracket 23, a load-side bearing 25, a counter-load-side bracket 27, and a counter-load-side bearing 29. The shaft 17 is supported by a load-side bearing 25 and a counter-load-side bearing 29 so as to be rotatable about an axis AX. The opposite side of the shaft 17 protrudes from the anti-load side bracket 27, and a brake 9 and an encoder 11 are provided in the protruding portion.

The brake 9 (an example of the device) is, for example, a non-excitation operative type brake, which operates when the brake power is not supplied and brakes the shaft 17 of the motor 7 so as not to rotate, and opens the motor 7 to allow the shaft 17 to rotate when the brake power is supplied. It should be noted that the type of the brake 9 is not limited to the non-excitation operative type, but may be, for example, an excitation operative type.

The brake 9 includes a field core 31, an armature 33, a brake disc 35, and a fixed plate 37.

The field core 31 has a brake coil 39 and a spring 41. The coil end 43 of the brake coil 39 is electrically connected to the motor control apparatus 5. The armature 33 is supported so as not to rotate with respect to the field core 31 but to be movable in the axial direction of the shaft 17. The brake disc 35 is supported by the shaft 17 via the hub 44 so as to be non-rotatable and axially movable with respect to the shaft 17. The brake disc 35 has friction materials 45 on the surface of the load side and the surface of the counter load side. The fixed plate 37 is fixed to an anti-load side bracket 27 or the like.

When the brake coil 39 is not energized (no excitation state), the armature 33 is pressed toward the load side by the spring 41, and the friction material 45 of the brake disc 35 is sandwiched between the armature 33 and the fixed plate 37. As a result, the shaft 17 is held so as not to rotate when the brake power is not supplied. This state is the actuating state of the brake 9. On the other hand, in the state where the brake coil 39 is energized (excitation state), the armature 33 is attracted to the side opposite to the load by the magnetic attraction force of the brake coil 39, and the brake disc 35 is released. As a result, the shaft 17 can be rotated. This state is the open state of the brake 9.

The encoder 11 includes an encoder body 47, an encoder cover 49, and the acceleration sensor 13. The encoder body 47 includes, for example, a disk (not illustrated) that rotates together with the shaft 17, and a substrate (not illustrated) on which a detection circuit for detecting a pattern formed on the disk is mounted. The encoder cover 49 is fixed to the brake 9 and accommodates the encoder body 47. The acceleration sensor 13 is disposed, for example, inside the encoder cover 49. The acceleration sensor 13 may be mounted on the encoder body 47 (e.g., mounted on a substrate).

It should be noted that the configurations of the motor 7, the brake 9, and the encoder 11 described above are merely examples, and are not limited to the above. For example, the encoder 11 may be disposed between the motor 7 and the brake 9, or at least one of the brake 9 and the encoder 11 may be disposed on the load side of the motor 7. Further, the acceleration sensor 13 may be installed outside the encoder cover 49, or may be installed inside or outside the motor 7 or the brake 9.

3. Functional Configuration of Host Control Apparatus, Motor Control Apparatus, and Engineering Tool Referring to FIGS. 3 to 12, an example of a functional configuration of the host control apparatus 3, the motor control apparatus 5, and the engineering tool 15 will be described.

Figure 3:
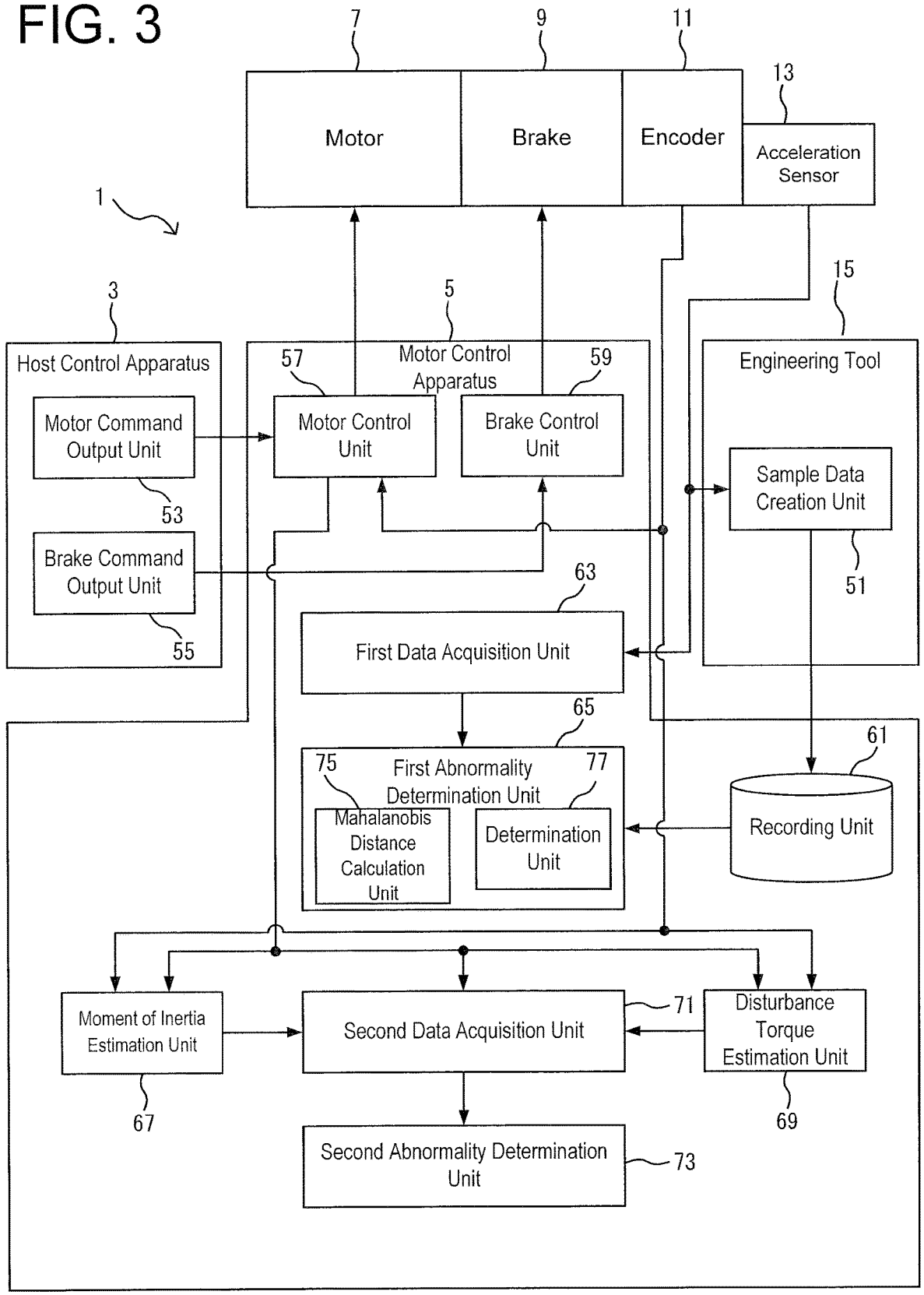
FIG. 3 is a block diagram showing an example of a functional configuration of a host control apparatus, a motor control apparatus, and an engineering tool.

As shown in FIG. 3, the engineering tool 15 includes a sample data creation unit (an example of "sample data creation circuitry") 51. The sample data creation unit 51 creates sample data based on abnormality time-series data while an abnormality occurs in the releasing operation of the brake 9 (an example of abnormality time-series data while an abnormality occurs in the operation of the device).

Figure 4:
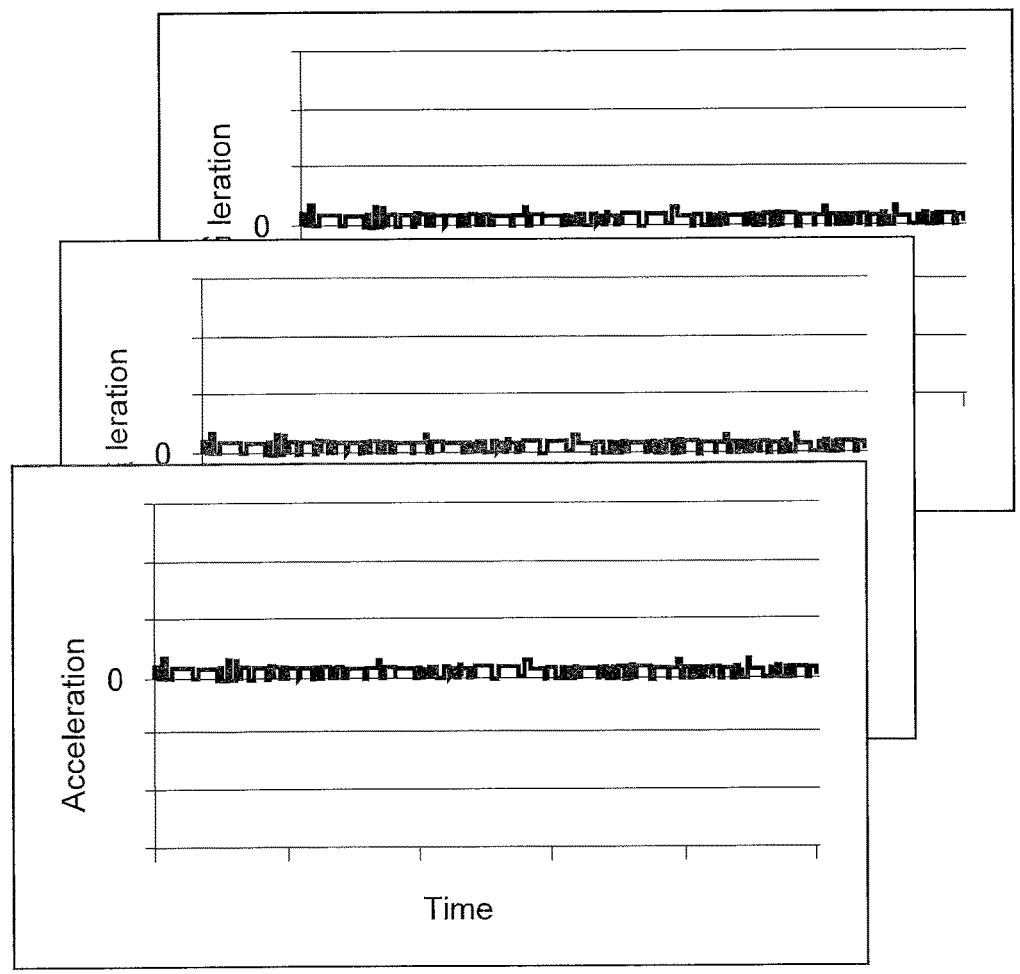
FIG. 4 is a diagram showing an example of sample data created by a sample data creation unit.

FIG. 4 shows an example of sample data created by the sample data creation unit 51. As shown in FIG. 4, the sample data creation unit 51 acquires time-series data in the case where an abnormality occurs in the releasing operation of the brake 9 from the acceleration sensor 13 a plurality of times to form a plurality of sample data. Specifically, on the premise that the brake 9 is in an abnormal state (for example, a state in which the mechanism does not operate), the brake control unit 59 of the motor control apparatus 5 supplies power to the brake 9 in response to a releasing command from the brake command output unit 55 of the host control apparatus 3 over a plurality of times (for example, several to several tens of times). The supply of the brake power is performed in a state where the motor command output unit 53 of the host control apparatus 3 does not output a motor command. The sample data creation unit 51 acquires time-series data at each time, extracts a predetermined period, and creates a plurality of sample data. "Time-series data" refers to data in which a large number of detection data groups detected by the acceleration sensor 13 are arranged in time-series. The "predetermined period" is a predetermined length of time including before and after the timing at which the brake control unit 59 of the motor control apparatus 5 supplies electric power to the brake 9 in response to the release command from the brake command output unit 55 of the host control apparatus 3 (hereinafter referred to as "release timing" as appropriate). "When an abnormality occurs in the releasing operation of the brake 9" means a case where the brake 9 does not operate even though electric power is supplied to the brake 9. In the releasing operation of the brake 9, since the brake 9 does not operate and vibration is not detected at the time of abnormality, the time-series data detected by the acceleration sensor 13 does not change much and the variation among the plurality of time-series data is small. The plurality of pieces of sample data created by the sample data creation unit 51 are transmitted to and recorded in the motor control apparatus 5.

Further, the sample data creation unit 51 calculates a sample average μ and a sample covariance matrix Σ from the created sample data group based on, for example, the following expression. Note that $x^{(n)}$ is the n-th type of sample data.

$$\hat{\mu} = \frac{1}{N}\sum_{n=1}^{N} x^{(n)}$$

$$\hat{\Sigma} = \frac{1}{N}\sum_{n=1}^{N} \left(x^{(n)} - \hat{\mu}\right)\left(x^{(n)} - \hat{\mu}\right)^T$$

Further, the sample data creation unit 51 calculates a data abnormality determination threshold $a_{th}$ from the false alarm rate a and the chi-square distribution on the basis of the following equation.

$$1-\alpha = \int_0^{a_{th}} dx \chi^2(x|M,1)$$

It should be noted that the false alarm rate a is an index for setting the case where the distribution deviates from the normal distribution by how much to be regarded as abnormal data. The chi-square distribution is defined by the following equation. The degree of freedom M is a parameter for designating the number of types of independent sample data (the number of types of variables), and in this embodiment, M=1.

$$\chi^2(x \mid M, 1) = \frac{1}{2\Gamma\left(\frac{M}{2}\right)} \left(\frac{x}{2}\right)^{\frac{M}{2}-1} e^{-\frac{x}{2}}$$

Here, $\Gamma$ represents a gamma function and is defined by the following equation.

$$\Gamma\left(\frac{M}{2}\right) = \int_0^\infty dt \, t^{\frac{M}{2}-1} e^{-t}$$

The sample average $\mu$, the sample covariance matrix $\Sigma$, and the data abnormality determination threshold $a_{th}$ calculated by the sample data creation unit 51 are transmitted to and recorded in the motor control apparatus 5.

Referring back to FIG. 3, the host control apparatus 3 includes a motor command output unit 53 and a brake command output unit 55. The motor command output unit 53 (an example of "operation command output circuitry") generates a motor command (an example of the operation command, for example, a position command, a speed command, a torque command, and the like) for controlling the operation of the motor 7 and transmits to the motor control unit 57 of the motor control apparatus 5. The brake command output unit 55 (an example of "release command output circuitry") generates an activation command for activating the brake 9 or a release command for releasing the brake 9, and transmits the generated operation command to the brake control unit 59 of the motor control apparatus 5.

The motor control apparatus 5 (an example of the abnormality determination apparatus) includes a motor control unit 57, a brake control unit 59, a recording unit 61, a first data acquisition unit (an example of "first data acquisition circuitry") 63, a first abnormality determination unit (an example of "first abnormality determination circuitry") 65, a moment of inertia estimation unit (an example of "moment of inertia estimation circuitry") 67, a disturbance torque estimation unit (an example of "disturbance torque estimation circuitry") 69, a second data acquisition unit (an example of "second data acquisition circuitry") 71, and a second abnormality determination unit (an example of "second abnormality determination circuitry") 73.

The motor control unit 57 controls the motor 7 by supplying electric power to the motor 7 based on the motor command received from the motor command output unit 53 of the host control apparatus 3 and the detection data received from the encoder 11. Specifically, the motor control unit 57 includes, for example, a position control unit, a speed control unit, a current control unit (not illustrated) and the like. For example, when a position command is received from the host control apparatus 3, the position control unit generates a speed command based on a position deviation obtained by subtracting a feedback position based on the detection data of the encoder 11 from the position command by, for example, PID control. The speed control unit generates a torque command by, for example, PID control or the like based on a speed deviation obtained by subtracting a feedback speed based on the detection data of the encoder 11 from the speed command. The current control section performs power conversion based on the torque command and supplies power to the motor 7.

The brake control unit 59 controls the brake 9 by supplying or cutting off electric power to the brake 9 based on the brake command received from the brake command output unit 55 of the host control apparatus 3. Specifically, the brake control unit 59 includes, for example, a brake power supply device (not illustrated) for supplying electric power to the brake 9, and a relay (not illustrated) having contacts for supplying or cutting off electric power from the brake power supply device. When receiving a release command for releasing the brake 9 from the host control apparatus 3, the brake control unit 59 closes the contact of the relay and supplies electric power to the brake 9. On the other hand, when the brake control unit 59 receives an activation command for activating the brake 9 from the host control apparatus 3, the brake control unit 59 opens the contact of the relay to cut off the power supply to the brake 9.

The recording unit 61 is composed of, for example, a nonvolatile memory or a hard disk. The recording unit 61 receives and records the sample data generated by the sample data creation unit 51 of the engineering tool 15, the calculated sample average $\mu$, the sample covariance matrix $\Sigma$, and the data abnormality determination threshold $a_{th}$.

The first data acquisition unit 63 acquires time-series data related to the state of the releasing operation of the brake 9 (an example of time-series data related to the operating state of the drive unit). The type of the time-series data is not particularly limited as long as it is data indicating whether or not the releasing operation of the brake 9 is normally performed, but in the present embodiment, for example, the time-series data is acquired from the acceleration sensor 13 that detects vibration caused by the releasing operation of the brake 9. The first data acquisition unit 63 acquires the time-series data for a predetermined period including before and after the above-described release timing before the motor command output unit 53 of the host control apparatus 3 outputs the motor command (in a state where the motor command is not output).

Based on the time-series data acquired by the first data acquisition unit 63 and the sample data read from the recording unit 61, the first abnormality determination unit 65 determines an abnormality in the releasing operation of the brake 9 (an example of an abnormality in the operation of the drive unit). The first abnormality determination unit 65 determines abnormality in the releasing operation of the brake 9 before the motor command output unit 53 of the host control apparatus 3 outputs the motor command (in a state where the motor command is not output). A method for determining abnormality is not particularly limited, but in this embodiment, determination is made using, for example, a Mahalanobis distance. The first abnormality determination unit 65 includes a Mahalanobis distance calculation unit (an example of "Mahalanobis distance calculation circuitry") 75 and a determination unit (an example of "determination circuitry") 77. The Mahalanobis distance calculation unit 75 calculates the Mahalanobis distance based on the sample data and the time-series data. The determination unit 77 compares the calculated Mahalanobis distance with the threshold value to determine whether the releasing operation of the brake 9 is abnormal. As described above, the sample data is generated based on the time-series data when an abnormality occurs in the releasing operation of the brake 9. Therefore, the determination unit 77 compares the current time-series data with the sample data, and determines that it is normal when the number of points at which the Mahalanobis distance is equal to or greater than the threshold value is larger than a predetermined value (when the deviation between the time-series data and the sample data is large), and that it is abnormal when the number of points at which the Mahalanobis distance is equal to or greater than the threshold value is smaller than a predetermined value (when the deviation between the time-series data and the sample data is small).

Specifically, the Mahalanobis distance calculation unit 75 calculates the Mahalanobis distance a (x') based on the following equation, based on the sample average μ and the sample covariance matrix Σ read from the recording unit 61 and the time-series data acquired by the first data acquisition unit 63.

$$a(x') = (x' - \hat{\mu})^T \hat{\Sigma}^{-1} (x' - \hat{\mu})$$

The determination unit 77 compares the data abnormality determination threshold value $a_{th}$ read from the recording unit 61 with the Mahalanobis distance a (x') calculated by the Mahalanobis distance calculation unit 75. If the number of points at which the Mahalanobis distance a (x') is equal to or greater than the data abnormality determination threshold $a_{th}$ is larger than a predetermined value, it is determined to be normal, and if the number of points at which the Mahalanobis distance a (x') is equal to or greater than the data abnormality determination threshold $a_{th}$ is smaller than a predetermined value, it is determined to be abnormal.

FIGS. 5 and 6 show an example of the abnormality determination by the first abnormality determination unit 65. As shown in FIG. 5, when the releasing operation of the brake 9 is normal, the time-series data detected by the acceleration sensor 13 changes significantly at the releasing timing, and the dispersion (for example, the dispersion of amplitude and the like) among the plurality of time-series data also increases. Therefore, if a plurality of pieces of normal time-series data are acquired to create sample data and current time-series data is compared with sample data to calculate a Mahalanobis distance to determine an abnormality, the Mahalanobis distance may become large even if the releasing operation is normal, and the abnormality may not be correctly detected. In this embodiment, as described above, a plurality of pieces of time-series data at abnormal times with small variations are acquired to create sample data, and the current time-series data is compared with the sample data to calculate the Mahalanobis distance. As a result, as shown in FIG. 5, when the releasing operation of the brake 9 is normal, the number of points at which the Mahalanobis distance is equal to or greater than the threshold value increases. Therefore, when the number of points is larger than the predetermined value (or larger than the predetermined value), it is determined to be normal, so that accurate abnormality determination can be performed even when the variation of the time-series data in the normal state is large. It should be noted that the predetermined value is a threshold value of points at which the Mahalanobis distance is equal to or greater than the threshold value for determining abnormality in the releasing operation of the brake 9.

On the other hand, as shown in FIG. 6, when the releasing operation of the brake 9 is abnormal, the change in the time-series data detected by the acceleration sensor 13 is small and the variation among the plurality of time-series data is small. Therefore, the number of points at which the Mahalanobis distance is equal to or greater than the threshold value decreases, and when the number of points is smaller than the predetermined value (or equal to or less than the predetermined value), it is determined as abnormal, so that accurate abnormality determination can be performed.

Referring back to FIG. 3, the moment of inertia estimation unit 67 estimates the moment of inertia of the motor 7 based on the torque command generated by the speed control unit of the motor control unit 57 and the feedback acceleration based on the detection data of the encoder 11.

The disturbance torque estimation unit 69 estimates the disturbance torque to be added to the motor 7 based on the torque command generated by the speed control unit of the motor control unit 57 and the feedback speed based on the detection data of the encoder 11.

The second data acquisition unit 71 acquires state quantity data relating to the operating state of the motor 7. Although the type of the "state quantity data" is not particularly limited as long as it is data representing the operating state of the motor 7, in this embodiment, the second data acquisition unit 71 acquires the estimated value of the moment of inertia estimated by the moment of inertia estimation unit 67, the estimated value of the disturbance torque estimated by the disturbance torque estimation unit 69, and the torque command value generated by the speed control unit of the motor control unit 57. The acquisition timing of each state quantity data by the second data acquisition unit 71 is after the motor command output unit 53 of the host control apparatus 3 outputs the motor command (including the timing at which the motor command is outputted). For example, the second data acquisition unit 71 acquires each of the state quantity data at the time when the motor command output unit 53 first outputs the motor command (the time when the motor control unit 57 of the motor control apparatus 5 supplies electric power to the motor 7) after the brake command output unit 55 of the host control apparatus 3 outputs the release command and the brake control unit 59 of the motor control apparatus 5 supplies electric power to the brake 9.

The second abnormality determination unit 73 determines abnormality in the releasing operation of the brake 9 based on the state quantity data (for example, an estimated value of moment of inertia, an estimated value of disturbance torque, a torque command value, and the like) acquired by the second data acquisition unit 71. The timing of the abnormality determination by the second abnormality determination unit 73 is after the motor command output unit 53 of the host control apparatus 3 outputs the motor command (including the timing at which the motor command is output). For example, the second abnormality determination unit 73 determines an abnormality at the time when the motor command output unit 53 first outputs a motor command (the time when the motor control unit 57 of the motor control apparatus 5 supplies electric power to the motor 7) after the brake command output unit 55 of the host control apparatus 3 outputs an releasing command and the brake control unit 59 of the motor control apparatus 5 supplies electric power to the brake 9.

Figure 8:
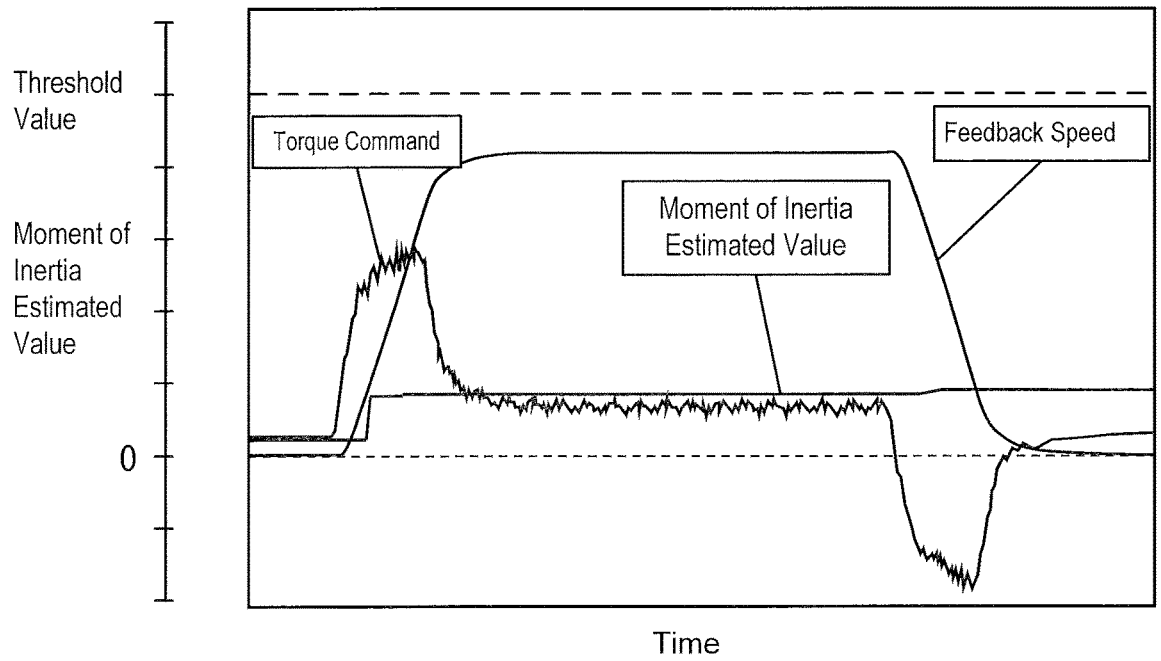
FIG. 8 is a graph showing an example of a waveform of an estimated value of moment of inertia.
Figure 9:
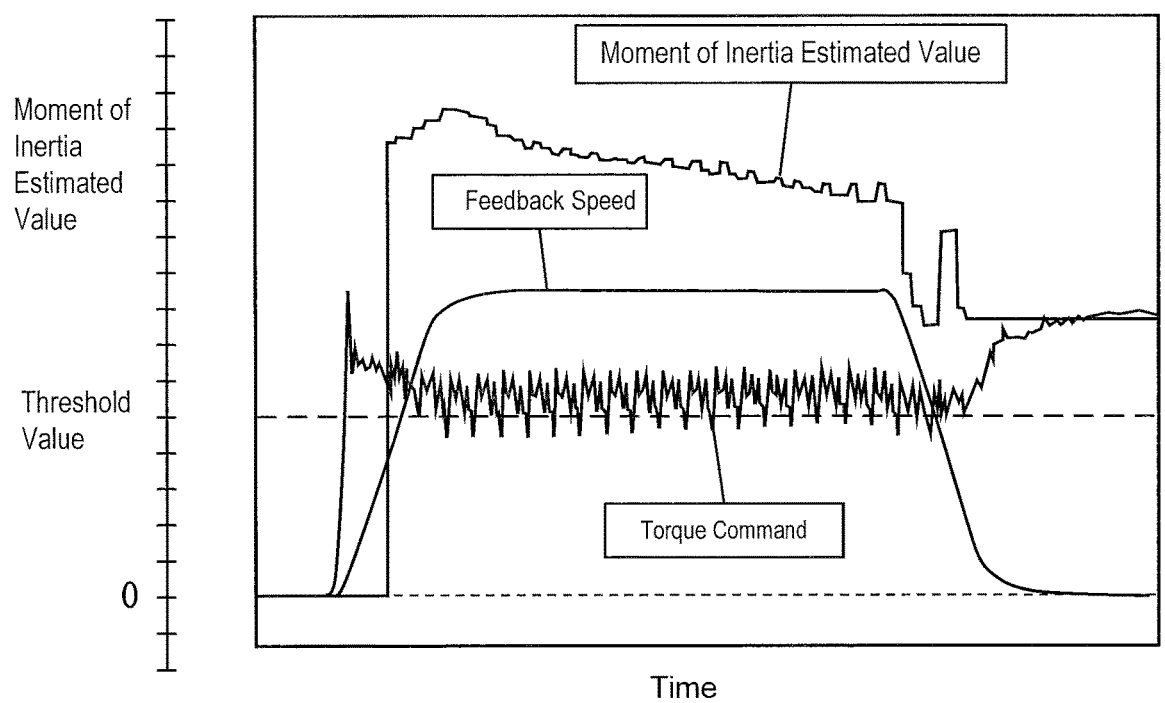
FIG. 9 is a graph showing another example of the waveform of the estimated moment of inertia.

FIGS. 7 to 9 show an example of abnormality determination using the estimated value of moment of inertia by the second abnormality determination unit 73. When there is an abnormality in the releasing operation of the brake 9, the motor 7 is braked even after outputting the releasing command (after supplying electric power to the brake 9). Therefore, as shown in FIGS. 8 and 9, the estimated value of the moment of inertia of the motor 7 becomes abnormally large as compared with the normal state at the time when the motor command is outputted for the first time after the release of the brake (the time when the electric power is supplied to the motor 7). In the present embodiment, as shown in FIG. 7, the second abnormality determination unit 73 determines that it is normal when the estimated value of the moment of inertia is smaller than the threshold value (or equal to or less than the threshold value), and determines that it is abnormal when the estimated value of the moment of inertia is larger than the threshold value (or equal to or greater than the threshold value). As a result, accurate abnormality determination can be performed.

Figure 11:
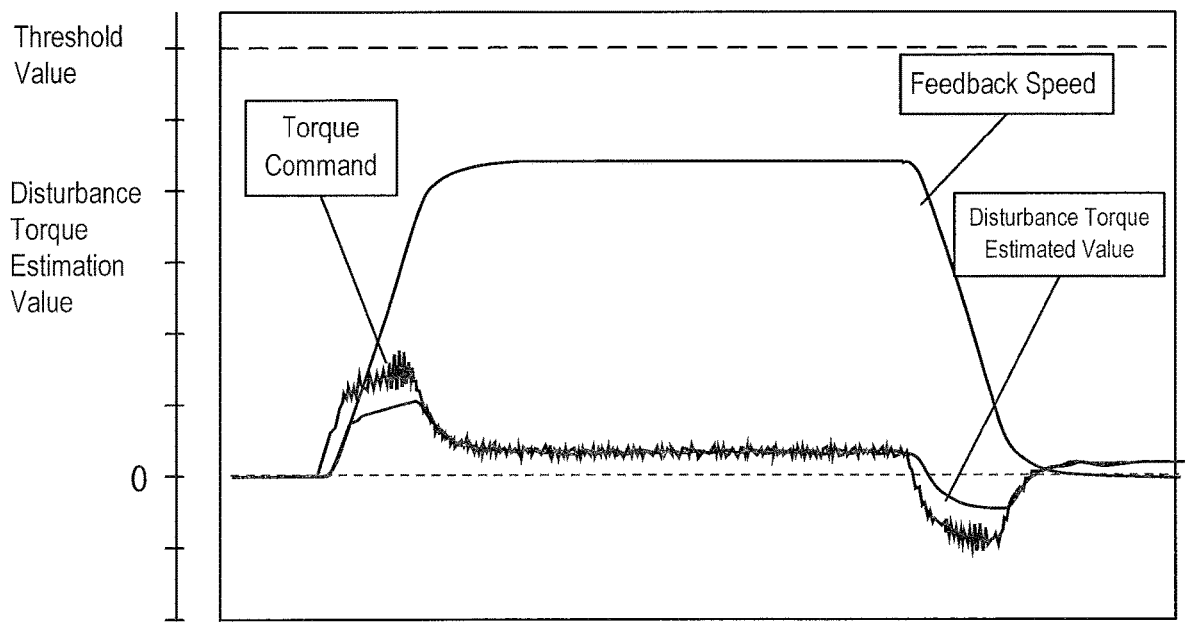
FIG. 11 is a graph showing an example of a waveform of the disturbance torque estimation value.
Figure 12:
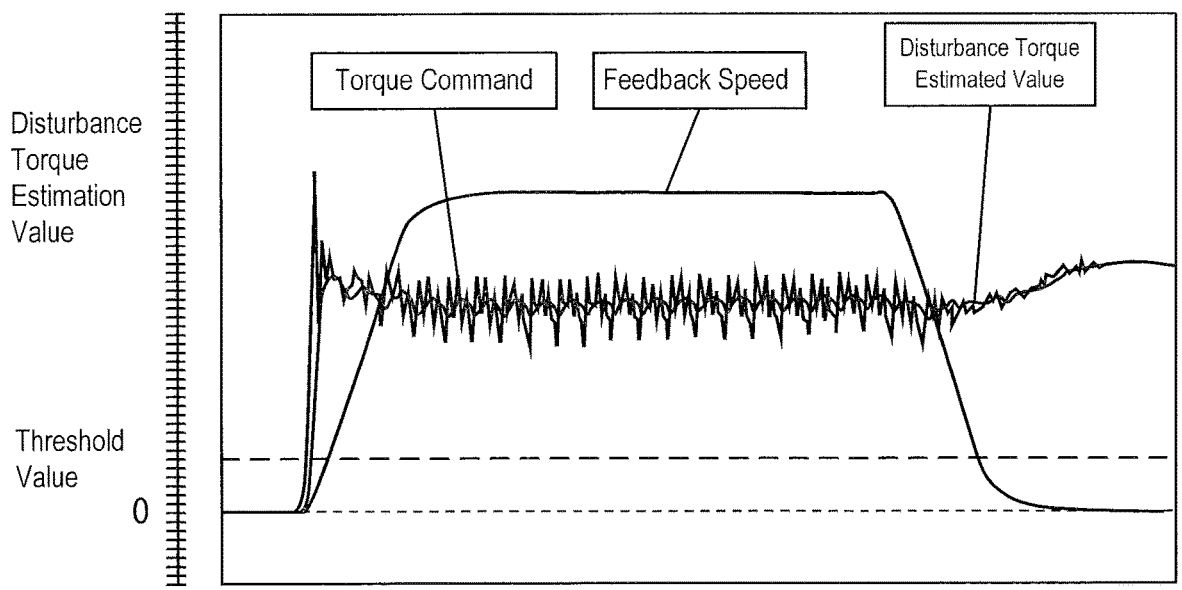
FIG. 12 is a graph showing another example of the waveform of the disturbance torque estimation value.

FIGS. 10 to 12 show an example of abnormality determination using the disturbance torque estimation value by the second abnormality determination unit 73. When there is an abnormality in the releasing operation of the brake 9, the motor 7 is braked even after outputting the releasing command (after supplying electric power to the brake 9). Therefore, as shown in FIGS. 11 and 12, at the time when the motor command is outputted for the first time after the brake is released (at the time when the electric power is supplied to the motor 7), the estimated disturbance torque value of the motor 7 becomes abnormally large as compared with the normal state and substantially equal to the torque command value. In the present embodiment, as shown in FIG. 10, the second abnormality determination unit 73 determines that the disturbance torque is normal when the estimated value of the disturbance torque is smaller than the threshold value (or equal to or less than the threshold value), and determines that the disturbance torque is abnormal when the estimated value of the disturbance torque is larger than the threshold value (or equal to or greater than the threshold value) and when the estimated value of the disturbance torque is substantially equal to the torque command value. As a result, accurate abnormality determination can be performed.

It should be noted that the sharing of processing among the devices described above is not limited to the above example. For example, some or all of the respective processes in the motor control apparatus 5 may be implemented in the host control apparatus 3 or the engineering tool 15. Further, part or all of the respective processes in the host control apparatus 3 may be mounted in the motor control apparatus 5 or the engineering tool 15. In addition, some or all of the respective processes in the engineering tool 15 may be implemented in the host control apparatus 3 or the motor control apparatus 5.

In the above, the calculation of the sample average μ, the sample covariance matrix Σ, and the data abnormality determination threshold $a_{th}$ with a relatively large processing load are executed by the engineering tool 15, the calculation results are recorded in the motor control apparatus 5, and the motor control apparatus 5 executes the calculation of the Mahalanobis distance with a relatively small processing load and the abnormality determination, thereby reducing the processing load of the motor control apparatus 5. For example, all of the above-described processing may be executed by any one of the motor control apparatus 5, the host control apparatus 3, and the engineering tool 15, or may be executed by two or more devices with different sharing from that described above.

In addition, the processes in the motor command output unit 53 and the brake command output unit 55 of the host control apparatus 3, the processes in the first data acquisition unit 63, the first abnormality determination unit 65, the moment of inertia estimation unit 67, the disturbance torque estimation unit 69, the second data acquisition unit 71, and the second abnormality determination unit 73 of the motor control apparatus 5, and the processes in the sample data creation unit 51 of the engineering tool 15 are not limited to the examples of sharing of these processes. For example, the processing may be performed by a smaller number of processing units (for example, one processing unit), or may be performed by further subdivided processing units. In addition, in the motor control apparatus 5, only a portion for supplying electric power to the motor 7 and the brake 9 is mounted by an actual device, and the other functions of the above-mentioned processing portions may be mounted by a program executed by a CPU901 (see FIG. 14) described later, or a part or all of the functions may be mounted by an actual device such as an ASIC, an FPGA, or other electric circuit.

4. Processing Procedure of Host Control Apparatus and Motor Control Apparatus 5

Figure 13:
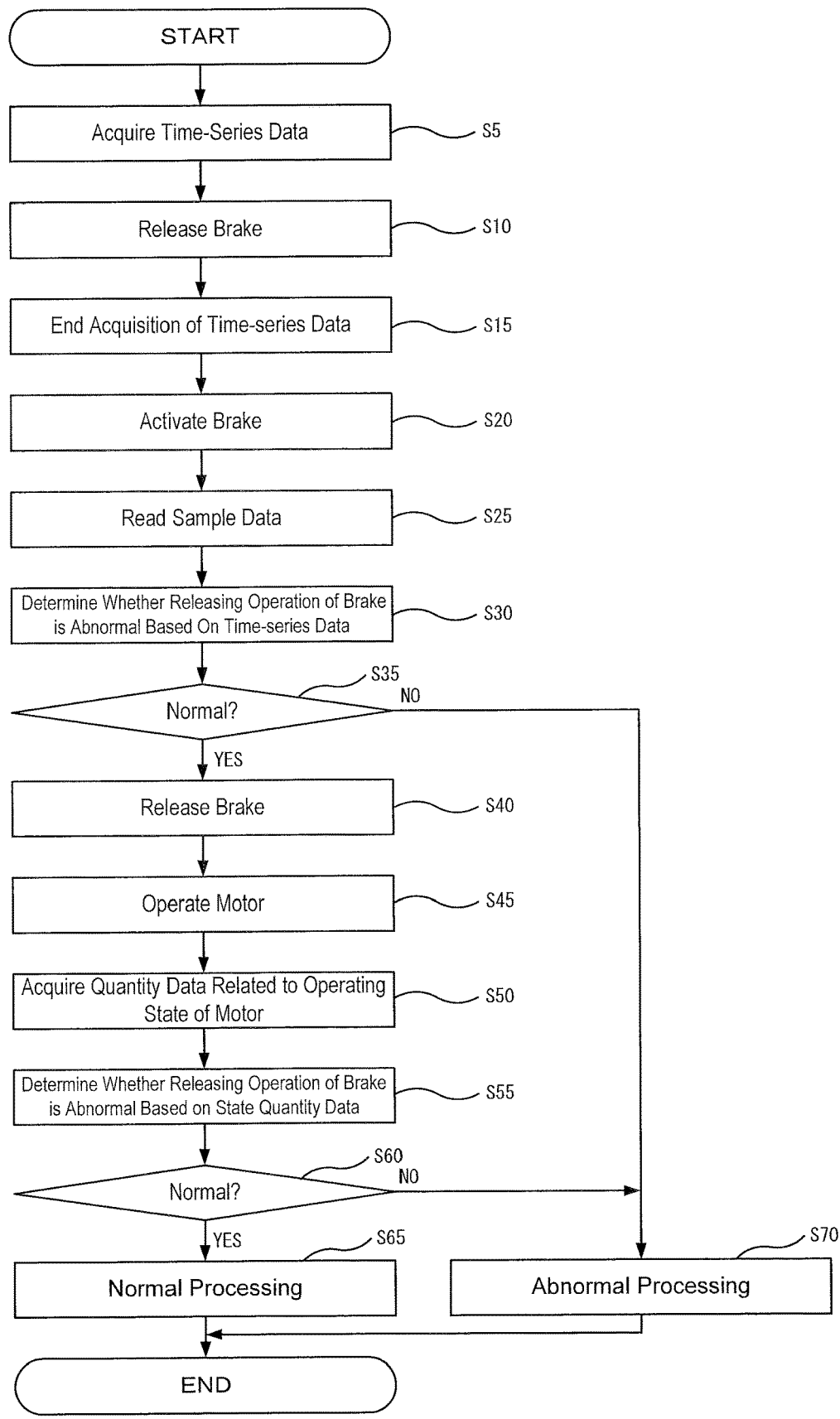
FIG. 13 is a flowchart showing an example of a processing procedure executed by the host control apparatus and the motor control apparatus.

An example of a processing procedure (abnormality determination method) executed by the host control apparatus 3 and the motor control apparatus 5 will be described with reference to FIG. 13. It is assumed that the brake 9 is in an activating state at the start point of this flowchart.

In step S5, the motor control apparatus 5 starts to acquire the time-series data from the acceleration sensor 13 by the first data acquisition unit 63.

In step S10, the host control apparatus 3 outputs a release command through the brake command output unit 55, and the motor control apparatus 5 supplies electric power to the brake 9 through the brake control unit 59. As a result, when the brake 9 is normal, it is opened, and when the brake 9 is abnormal, it is not operated and the activating state is maintained.

In step S15, the motor control apparatus 5 ends the acquisition of the time-series data from the acceleration sensor 13 by the first data acquisition unit 63.

In step S20, the host control apparatus 3 outputs an activation command by the brake command output unit 55, and the motor control apparatus 5 stops the power supply to the brake 9 by the brake control unit 59 to activate the brake 9.

In step S25, the motor control apparatus 5 reads the sample data and various calculation results (sample average μ, sample covariance matrix Σ, data abnormality determination threshold $a_{th}$, etc.) recorded in the recording unit 61 by the first abnormality determination unit 65.

In step S30, the motor control apparatus 5 uses the first abnormality determination unit 65 to determine whether the releasing operation of the brake 9 is normal or abnormal based on the time-series data acquired in steps S5 to S15 and the sample data read in step S25.

In step S35, the motor control apparatus 5 determines whether or not the determination result in step S30 is normal. If it is normal (step S35: YES), the process proceeds to step S40. If it is abnormal (step S35: NO), the process proceeds to step S70 described later.

In step S40, the host control apparatus 3 outputs a release command through the brake command output unit 55, and the motor control apparatus 5 supplies electric power to the brake 9 through the brake control unit 59. As a result, when the brake 9 is normal, it is released, and when the brake 9 is abnormal, it is not operated and the activating state is maintained.

In step S45, the host control apparatus 3 outputs a motor command by the motor command output unit 53, and the motor control apparatus 5 supplies electric power to the motor 7 by the motor control unit 57. As a result, when the brake 9 is normally released, the motor 7 starts to operate, and when the brake 9 is abnormal, the motor 7 does not operate because it is braked.

In step S50, the motor control apparatus 5 acquires state quantity data related to the operating state of the motor 7 by the second data acquisition unit 71. As described above, the state quantity data includes an estimated value of the moment of inertia, an estimated value of the disturbance torque, a torque command value, and the like.

In step S55, the motor control apparatus 5 uses the second abnormality determination unit 73 to determine whether the releasing operation of the brake 9 is normal or abnormal based on the state quantity data acquired in step S50.

In step S60, the motor control apparatus 5 determines whether or not the determination result in step S55 is normal. If it is normal (step S60: YES), the process proceeds to step S65, and normal processing set to be executed when it is determined to be normal is executed. The normal process includes, for example, a process of transmitting a result determined to be normal to the host control apparatus 3 or the engineering tool 15, a process of ending the abnormality determination process and starting the normal operation (actual operation), and the like.

On the other hand, in step S60, when the determination result in step S55 is abnormal (step S60: NO), the process proceeds to step S70, where abnormality processing set to be executed when it is determined to be abnormal is executed. The abnormality processing includes, for example, processing for outputting an alarm, processing for transmitting a result of determination of abnormality to the host control apparatus 3 or the engineering tool 15, and processing for stopping the normal operation (actual operation). Thus, the present flowchart is completed.

According to the above-described processing procedure, before outputting the motor command in step S45, it is determined in step S30 whether or not the releasing operation of the brake 9 is abnormal. As a result, the abnormality can be determined before the motor 7 operates, so that the abnormality can be determined without applying a load to the brake 9. Further, since there is no influence from the machine side other than the brake, the abnormality can be accurately determined. Also after the motor command is output in step S45, it is determined in step S55 that the releasing operation of the brake 9 is abnormal. As a result, abnormality determination can be performed in two stages before and after operation of the motor 7, so that accuracy and reliability of abnormality determination can be improved. If the results of the abnormality determination are different from each other, it is possible to detect that an abnormality occurs in one of the abnormality determination functions itself.

It should be noted that the processing procedure described above is an example, and at least a part of the above procedure may be deleted or changed, or other procedures may be added. The order of at least some of the above steps may be changed, or a plurality of steps may be combined into a single step.

5. Effects of Embodiment

As described above, the abnormality determination system 1 according to the present embodiment includes a first data acquisition unit 63 that acquires the time-series data related to the operating state of the device, a sample data creation unit 51 that creates sample data based on the time-series data when an abnormality occurs in the operation of the device, and a first abnormality determination unit 65 for determining an operation abnormality of the device based on the time-series data acquired by the first data acquisition unit 63 and the sample data created by the sample data creation unit 51.

The motor control apparatus 5 includes the first data acquisition unit 63 that acquires time-series data relating to the operating state of the device, and a first abnormality determination unit 65 that determines an operation abnormality of the device on the basis of the time-series data acquired by the first data acquisition unit 63 and sample data created on the basis of the time-series data when an abnormality occurs in the operation of the device.

In general, in a system for determining abnormality of the device, sample data is generated from time-series data in a normal state, and the present time-series data is compared with the sample data to determine abnormality. In this case, when the variation of the time-series data in the normal state is large, there is a possibility that the abnormality cannot be correctly detected.

In this embodiment, abnormality determination is performed by using sample data created based on time-series data when abnormality occurs in the operation of the device. The current time-series data is compared with the sample data, and if the difference between the two data is larger than a predetermined amount, it is determined to be normal, and if the difference is smaller than a predetermined amount, it is determined to be abnormal. Thus, when the variation of the time-series data at the time of abnormality of the device is small, accurate abnormality determination can be performed even when the variation of the time-series data at the time of normal is large. Therefore, the accuracy of abnormality determination can be improved.

In the present embodiment, the first abnormality determination unit 65 may include a Mahalanobis distance calculation unit 75 for calculating the Mahalanobis distance based on the sample data and the time-series data, and a determination unit 77 for determining an operation abnormality of the device by comparing the Mahalanobis distance with a threshold value. In this case, the calculation relating to the abnormality determination can be simplified, and the abnormality determination with high accuracy can be executed while reducing the processing load.

In this embodiment, the first data acquisition unit 63 may acquire time-series data relating to the state of the releasing operation of the brake 9 for braking the motor 7, and the first abnormality determination unit 65 may determine abnormality in the releasing operation of the brake 9 on the basis of the time-series data acquired by the first data acquisition unit 63 and sample data created on the basis of the time-series data when abnormality occurs in the releasing operation of the brake 9.

In the releasing operation of the brake 9, since the brake 9 does not operate at the time of abnormality, the variation in the time-series data is reduced. On the other hand, although the brake 9 is released in a normal state, the variation of the time-series data may become large depending on the type of the time-series data to be acquired. Therefore, an accurate abnormality determination can be performed by performing an abnormality determination using the sample data created based on the time-series data when an abnormality occurs in the releasing operation of the brake 9.

Further, when the abnormality of the releasing operation of the brake 9 is determined using, for example, a brake current or voltage, it is necessary to separately provide a detection circuit on the outside or inside of the motor control apparatus 5, for example, which increases the cost. According to the present embodiment, since abnormality is determined based on the time-series data and the sample data, no detection circuit is required, and abnormality can be determined without increasing cost.

Further, in the present embodiment, since the sample data generated by the time-series data hen an abnormality occurs in the releasing operation of the brake 9 (a state in which both the brake 9 and the motor 7 do not operate) is used, the sample data is not affected by the work or the operation pattern. Therefore, even when the work or the operation pattern is changed, accurate abnormality determination can be performed without recreating the sample data.

In this embodiment, the abnormality determination system 1 may include a motor command output unit 53 that outputs a motor command for operating the motor 7, in which case, the first data acquisition unit 63 may acquire the time-series data before the motor command output unit 53 outputs the motor command, and the first abnormality determination unit 65 may determine an abnormality in the releasing operation of the brake 9 based on the time-series data and the sample data before the motor command output unit 53 outputs the motor command.

For example, when the motor 7 is operated while being braked by the brake 9 and an abnormality is determined by detecting a torque command or a rotation angle, a load is applied to the brake 9, which may affect the service, life of the brake 9. Further, since it is affected by a machine other than the brake, it is not always possible to diagnose only the brake 9.

In the present embodiment, before the motor command output unit 53 outputs the motor command, it is determined whether or not the releasing operation of the brake 9 is abnormal. Thus, the abnormality of the brake 9 can be determined in a state where the motor 7 is not operating, so that the abnormality can be determined without applying a load to the brake 9. Further, since there is no influence from the machine side other than the brake, the abnormality can be accurately determined.

In the present embodiment, the abnormality determination system 1 may include a second data acquisition unit 71 which acquires state quantity data relating to the operating state of the motor 7 after the motor command output unit 53 outputs the motor command, and a second abnormality determination unit 73 which determines abnormality in the releasing operation of the brake 9 based on the state quantity data after the motor command output unit 53 outputs the motor command.

In this case, since the abnormality determination can be performed in two stages before and after the motor 7 is operated, the accuracy and reliability of the abnormality determination can be improved. If the results of the abnormality determination are different from each other, it is possible to detect that an abnormality occurs in one of the abnormality determination functions itself.

In the present embodiment, the first data acquisition unit 63 may acquire the time-series data from the acceleration sensor 13 that detects the vibration caused by the releasing operation of the brake 9.

In this case, since the brake 9 does not operate and vibration is not detected at the time of abnormality, the change of the time-series data is small and the variation among the plurality of time-series data is small. Therefore, by performing abnormality determination using the sample data created based on the time-series data, accurate abnormality determination can be performed.

In this embodiment, the abnormality determination system 1 may include a brake command output unit 55 which outputs a release command for releasing the brake 9 and a moment of inertia estimation unit 67 which estimates the moment of inertia of the motor 7, and in this case, the second data acquisition unit 71 may acquire, as the state quantity data, an estimated value of the moment of inertia at the time when the motor command output unit 53 first outputs the motor command after the brake command output unit 55 outputs the release command, and the second abnormality determination unit 73 may determine an abnormality in the releasing operation of the brake 9 based on the estimated value of the moment of inertia.

When there is an abnormality in the releasing operation of the brake 9, the motor 7 is in a braked state even after the brake command output unit 55 outputs the releasing command, so that the estimated value of the moment of inertia of the motor 7 becomes abnormally large at the time when the motor command output unit 53 outputs the motor command. In this embodiment, the abnormality of the releasing operation of the brake 9 is determined based on the estimated value of the moment of inertia of the motor 7. For example, when the estimated value of the moment of inertia is larger than the threshold value, it can be determined that there is an abnormality. As a result, accurate abnormality determination can be performed.

In this embodiment, an abnormality determination system 1 may have a brake command output unit 55 that outputs a release command for releasing a brake 9 and a disturbance torque estimation unit 69 that estimates the disturbance torque of a motor 7, in which case, a second data acquisition unit 71 acquires, as state quantity data, an estimated value of the disturbance torque at the time when a motor command output unit 53 first outputs a motor command after the brake command output unit 55 outputs the release command, and a second abnormality determination unit 73 may determine an abnormality in the releasing operation of the brake 9 based on the estimated value of the disturbance torque.

When there is an abnormality in the releasing operation of the brake 9, since the motor 7 is in a braked state even after the brake command output unit 55 outputs the releasing command, the disturbance torque estimation value of the motor 7 becomes an abnormally large value equal to the torque command at the time when the motor command output unit 53 outputs the motor command. In this embodiment, the abnormality of the releasing operation of the brake 9 is determined based on the estimated value of the disturbance torque of the motor 7. For example, when the estimated value of the disturbance torque is larger than the threshold value, it can be determined that there is an abnormality. As a result, accurate abnormality determination can be performed.

6. Modified Example

The disclosed embodiments are not limited to the above, and various modifications may be made without departing from the spirit and technical concept thereof.

In the above-described embodiment, the first abnormality determination unit 65 determines abnormality by calculating the Mahalanobis distance, but the abnormality determination method is not limited to the above. For example, a statistical method such as a normal distribution may be used to determine abnormality. In this case, for example, a normal distribution may be created from a group of sample data, a data abnormality determination threshold may be set for the normal distribution, and if the current time-series data exceeds the data abnormality determination threshold set for the normal distribution, it may be determined as an abnormal.

Further, in the above-described embodiment, an example in which the abnormality determination system is applied to a case in which an abnormality of an releasing operation of a brake for braking a motor is determined has been described, but the object of abnormality determination is not limited to the above. The above-described abnormality determination system can be applied to a case of determining an operation abnormality of various devices other than a brake. In particular, the above-described abnormality determination system is suitable for a case where the variation of the time-series data related to the operating state is large when the device is normal and the variation of the time-series data related to the operating state is small when the device is abnormal.

7. Hardware Configuration Example of Motor Control Apparatus

Figure 14:
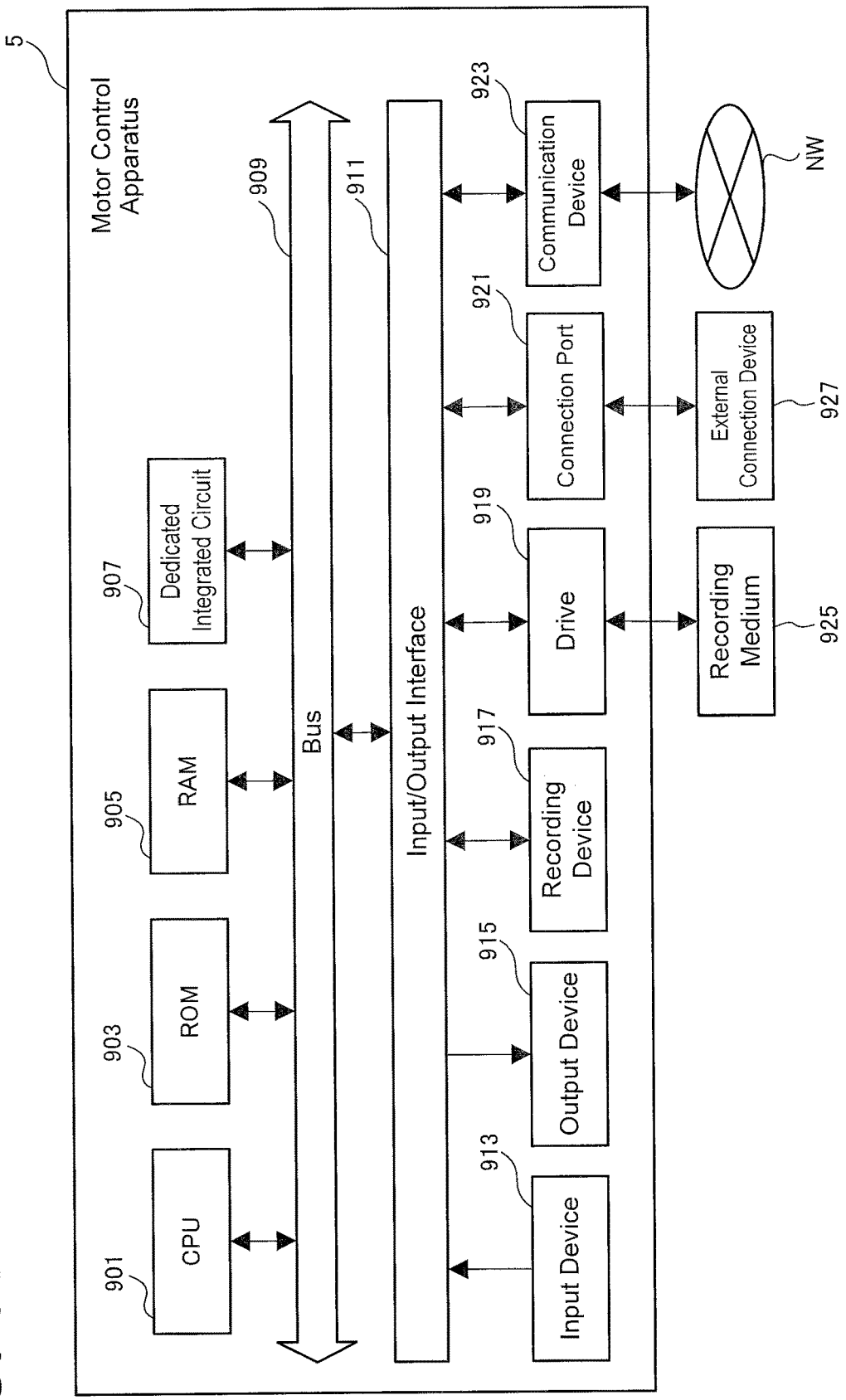
FIG. 14 is a block diagram showing an example of a hardware configuration of the motor control apparatus.

Referring to FIG. 14, a hardware configuration example of the motor control apparatus 5 will be described. In FIG. 14, of the configuration of the motor control apparatus 5, a configuration related to the function of supplying electric power to the motor 7 or the brake 9 is appropriately omitted. Further, the host control apparatus 3 or the engineering tool 15 may have a similar hardware configuration.

As shown in FIG. 14, the motor control apparatus 5 includes, for example, a CPU901, a ROM903, a RAM905, a dedicated integrated circuit 907 constructed for a specific application such as an ASIC or an FPGA, an input device 913, an output device 915, a recording device 917, a drive 919, a connection port 921, and a communication device 923. These components are connected to each other through a bus 909 and an input/output interface 911 so that signals can be transmitted to each other.

The program can be recorded in, for example, a recording device 917 such as a ROM903, a RAM905, or a hard disk.

The program may be temporarily or non-temporarily (permanently) recorded on, for example, a magnetic disk such as a flexible disk, an optical disk such as various CD, MO, and DVD, and a removable recording medium 925 such as a semiconductor memory. Such a recording medium 925 can also be provided as so-called package software. In this case, the program recorded on the recording medium 925 may be read out by the drive 919 and recorded in the recording device 917 via the input/output interface 911, the bus 909, or the like.

The program may be recorded in, for example, a download site, another computer, another recording device, or the like (not shown). In this case, the program is transferred via a network NW such as a LAN or the Internet, and the communication device 923 receives the program. The program received by the communication device 923 may be recorded in the recording device 917 via the input/output interface 911, the bus 909, or the like.

For example, the program may be recorded in an appropriate external connection device 927. In this case, the program may be transferred through an appropriate connection port 921 and recorded in the recording device 917 through an input/output interface 911, a bus 909, or the like.

The CPU901 executes various processes according to a program recorded in the recording device 917, thereby realizing the processes by the motor control unit 57, the brake control unit 59, the first data acquisition unit 63, the first abnormality determination unit 65, the moment of inertia estimation unit 67, the disturbance torque estimation unit 69, the second data acquisition unit 71, the second abnormality determination unit 73, and the like. For example, the CPU901 may directly read and execute the program from the recording device 917, or may execute the program after loading it into the RAM905. For example, when the CPU901 receives a program via the communication device 923, the drive 919, or the connection port 921, it may directly execute the received program without recording it in the recording device 917.

The CPU901 may perform various types of processing based on signals and information input from an input device 913 such as a mouse, keyboard, and microphone (not illustrated), as needed.

The CPU901 may output the result of execution of the above processing from an output device 915 such as a display device or an audio output device. The CPU901 may transmit the processing result through the communication device 923 or the connection port 921 as necessary. The CPU901 may record the processing result in the recording device 917 or the recording medium 925.

In addition to what has already been described above, techniques according to the above-described embodiments and various modifications may be used in combination as appropriate. In addition, although not illustrated individually, various modifications may be made to the above-described embodiments and modifications without departing from the spirit thereof.

The problems and effects to be solved by the above-described embodiments and modifications are not limited to the above-described contents. According to embodiments, modifications, and the like, problems not described above can be solved or effects not described above can be produced, and only a part of the problems described may be solved or only a part of the effects described may be produced.

As used herein, the term "comprise" and its variations are intended to mean open-ended terms, not excluding any other elements and/or components that are not recited herein. The same applies to the terms "include", "have", and their variations.

As used herein, a component suffixed with a term such as "member", "portion", "part", "element", "body", and "structure" is intended to mean that there is a single such component or a plurality of such components.

As used herein, ordinal terms such as "first" and "second" are merely used for distinguishing purposes and there is no other intention (such as to connote a particular order) in using ordinal terms. For example, the mere use of "first element" does not connote the existence of "second element"; otherwise, the mere use of "second element" does not connote the existence of "first element".

As used herein, approximating language such as "approximately", "about", and "substantially" may be applied to modify any quantitative representation that could permissibly vary without a significant change in the final result obtained. All of the quantitative representations recited in the present application shall be construed to be modified by approximating language such as "approximately", "about", and "substantially".

As used herein, the phrase "at least one of A and B" is intended to be interpreted as "only A", "only B", or "both A and B".

Obviously, numerous modifications and variations of the present disclosure are possible in light of the above teachings. It is therefore to be understood that within the scope of the appended claims, the present disclosure may be practiced otherwise than as specifically described herein.

What is claimed is:
1. An abnormality determination system comprising:
   first data acquisition circuitry configured to acquire time-series data relating to an operation of a device;
   sample data creation circuitry configured to create sample data based on abnormality time-series data which the first data acquisition circuitry acquires while an abnormality occurs in the operation of the device; and first abnormality determination circuitry configured to determine the abnormality in the operation of the device based on the time-series data and the sample data, wherein the time-series data relates to a brake releasing operation of a brake which is configured to brake a motor.

2. The abnormality determination system according to claim 1, wherein the first abnormality determination circuitry comprises:

Mahalanobis distance calculation circuitry configured to calculate a Mahalanobis distance based on the sample data and the time-series data; and determination circuitry configured to determine the abnormality in the operation of the device by comparing the Mahalanobis distance with a threshold value.

3. The abnormality determination system according to claim 1, further comprising:

operation command output circuitry configured to output an operation command to operate the motor, wherein the first data acquisition circuitry is configured to acquire the time-series data before the operation command output circuitry outputs the operation command, and wherein the first abnormality determination circuitry is configured to determine abnormality before the operation command output circuitry outputs the operation command.

4. The abnormality determination system according to claim 3, further comprising:

second data acquisition circuitry configured to acquire state quantity data relating to an operation of the motor after the operation command output circuitry outputs the operation command; and second abnormality determination circuitry configured to determine abnormality in the releasing operation of the brake based on the state quantity data after the operation command output circuitry outputs the operation command.

5. The abnormality determination system according to claim 4, further comprising:

release command output circuitry configured to output a release command to release the brake; and moment of inertia estimation circuitry configured to estimate a moment of inertia of the motor to obtain an estimated value of the moment of inertia, wherein the second data acquisition circuitry is configured to acquire, as the state quantity data, the estimated value of the moment of inertia at a timing at which the operation command output circuitry firstly outputs the operation command after the release command output circuitry outputs the release command, and wherein the second abnormality determination circuitry is configured to determine abnormality in the releasing operation of the brake based on the estimated value of the moment of inertia.

6. The abnormality determination system according to claim 4, further comprising:

release command output circuitry configured to output a release command to release the brake; and disturbance torque estimation circuitry configured to estimate disturbance torque of the motor to obtain an estimated value of the disturbance torque, wherein the second data acquisition circuitry is configured to acquire, as the state quantity data, the estimated value of the disturbance torque at a timing at which the operation command output circuitry firstly outputs the operation command after the release command output circuitry outputs the release command, and wherein, based on the estimated value of the disturbance torque, the second abnormality determination circuitry determines abnormality in the releasing operation of the brake based on the estimated value of the disturbance torque.

7. The abnormality determination system according to claim 1, further comprising:

an acceleration sensor configured to detect vibration caused by the releasing operation of the brake, wherein the first data acquisition circuitry is configured to acquire the time-series data based on the vibration detected by the acceleration sensor.

8. An abnormality determination system comprising:

operation command output circuitry configured to output an operation command to operate a motor;

first data acquisition circuitry configured to acquire, before the operation command output circuitry outputs the operation command, time-series data relating to a releasing operation of a brake which is configured to brake the motor;

first abnormality determination circuitry configured to determine, before the operation command output circuitry outputs the operation command, an abnormality in the releasing operation based on the time-series data;

second data acquisition circuitry configured to acquire, after the operation command output circuitry outputs the operation command, state quantity data relating to an operation of the motor; and second abnormality determination circuitry configured to determine, after the operation command output circuitry outputs the operation command, the abnormality in the releasing operation based on the state quantity data.

9. An abnormality determination system comprising:

operation command output circuitry configured to output an operation command to operate a motor;

data acquisition circuitry configured to acquire, after the operation command output circuitry outputs the operation command, state quantity data relating to an operation of the motor; and abnormality determination circuitry configured to determine based on the state quantity data, after the operation command output circuitry outputs the operation command, an abnormality in a releasing operation of a brake which is configured to brake the motor.

10. An abnormality determination apparatus comprising:

first data acquisition circuitry configured to acquire time-series data relating to a state in a releasing operation of a brake for a motor; and first abnormality determination circuitry configured to determine an abnormality in the releasing operation of the brake based on the time-series data and sample data created based on abnormality time-series data which the first data acquisition circuitry acquires while the abnormality occurs in the releasing operation of the brake.

11. An abnormality determination apparatus comprising:

first data acquisition circuitry configured to acquire, before an operation command for operating a motor is output, time-series data relating to a releasing operation of a brake which is configured to brake the motor;

first abnormality determination circuitry configured to determine, before the operation command is output, an abnormality in the releasing operation based on the time-series data;
second data acquisition circuitry configured to acquire, after the operation command is output, state quantity data relating to an operation of the motor; and
second abnormality determination circuitry configured to determine, after the operation command is output, the abnormality in the releasing operation based on the state quantity data.

12. An abnormality determination method comprising:
acquiring time-series data relating to a state in a releasing operation of a brake for a motor; and
determining an abnormality in the releasing operation of the brake based on the acquired time-series data and sample data created based on abnormality time-series data which is acquired while the abnormality occurs in the releasing operation of the brake.

13. An abnormality determination method comprising:
acquiring, before an operation command for operating a motor is output, time-series data relating to a releasing operation of a brake which is configured to brake the motor;
determining, before the operation command is output, an abnormality in the releasing operation based on the time-series data;
acquiring, after the operation command is output, state quantity data relating to an operation of the motor; and
determining, after the operation command is output, the abnormality in the releasing operation based on the state quantity data.

\* \* \* \* \*